United States Patent
Jung et al.

(10) Patent No.: US 10,318,806 B2
(45) Date of Patent: Jun. 11, 2019

(54) METHOD AND DEVICE FOR IRRADIATING LIGHT FOR PHOTOGRAPHING IRIS

(71) Applicant: Samsung Electronics Co., Ltd., Suwon-si, Gyeonggi-do (KR)

(72) Inventors: Dae-kwang Jung, Suwon-si (KR); Je-in Yu, Seoul (KR); In-kuk Yun, Suwon-si (KR); Jun-ho Koh, Suwon-si (KR); Byeong-hoon Kwak, Uiwang-si (KR); Sung-chan Kim, Suwon-si (KR); Yang-wook Kim, Hwaseong-si (KR); Chang-han Kim, Suwon-si (KR); Hyun-jung Kim, Suwon-si (KR); In-hak Na, Yongin-si (KR); Kang-jin Yoon, Seoul (KR); Yong-chan Lee, Seoul (KR); Jae-ho Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/049,956

(22) Filed: Feb. 22, 2016

(65) Prior Publication Data

US 2016/0260206 A1 Sep. 8, 2016

(30) Foreign Application Priority Data

Mar. 6, 2015 (KR) .................. 10-2015-0031959

(51) Int. Cl.
*G06K 9/00* (2006.01)
*G06K 9/20* (2006.01)
*H04N 5/225* (2006.01)

(52) U.S. Cl.
CPC ..... *G06K 9/00597* (2013.01); *G06K 9/00604* (2013.01); *G06K 9/209* (2013.01); *G06K 9/2027* (2013.01); *H04N 5/2254* (2013.01)

(58) Field of Classification Search
CPC .................... G06K 9/00597; H04N 5/2254
See application file for complete search history.

(56) References Cited

U.S. PATENT DOCUMENTS

| | | | |
|---|---|---|---|
| 5,424,927 A * | 6/1995 | Schaller | F21L 4/005 362/157 |
| 7,542,628 B2 | 6/2009 | Lolacono et al. | |
| 7,568,802 B2 | 8/2009 | Phinney et al. | |
| 7,925,059 B2 | 4/2011 | Hoyos et al. | |
| 8,243,133 B1 | 8/2012 | Northcott et al. | |
| 8,446,521 B2 | 5/2013 | Whillock | |

(Continued)

FOREIGN PATENT DOCUMENTS

| | | |
|---|---|---|
| JP | 2004-261515 A | 9/2004 |
| KR | 10-2009-0130696 A | 12/2009 |

(Continued)

*Primary Examiner* — Menatoallah Youssef
(74) *Attorney, Agent, or Firm* — Jefferson IP Law, LLP

(57) ABSTRACT

A method and device for controlling an irradiating light for photographing an iris is provided. The device includes a light source configured to generate light, an active lens configured to have an adjustable refractive index to change light passing through the active lens, an image capturer configured to capture an image of the iris by using a camera, and a controller configured to control the active lens to change the light passing through the active lens based on distance, motion and ambient light levels.

18 Claims, 14 Drawing Sheets

(56) References Cited

U.S. PATENT DOCUMENTS

| | | | |
|---|---|---|---|
| 8,698,180 B2 | 4/2014 | Yeh et al. | |
| 2003/0118212 A1* | 6/2003 | Min | G06K 9/00597 |
| | | | 382/100 |
| 2008/0044063 A1* | 2/2008 | Friedman | A61B 3/1216 |
| | | | 382/117 |
| 2009/0016574 A1 | 1/2009 | Tsukahara | |
| 2011/0261178 A1* | 10/2011 | Lo | A61B 1/05 |
| | | | 348/68 |
| 2013/0089240 A1* | 4/2013 | Northcott | G06K 9/00604 |
| | | | 382/117 |
| 2013/0135513 A1 | 5/2013 | Choi et al. | |
| 2013/0293457 A1* | 11/2013 | Yoon | G06F 3/011 |
| | | | 345/156 |
| 2014/0119021 A1* | 5/2014 | Duncan | F21V 14/00 |
| | | | 362/276 |

FOREIGN PATENT DOCUMENTS

| | | |
|---|---|---|
| KR | 10-2010-0044974 A | 7/2011 |
| KR | 10-2012-0020024 A | 3/2012 |

\* cited by examiner

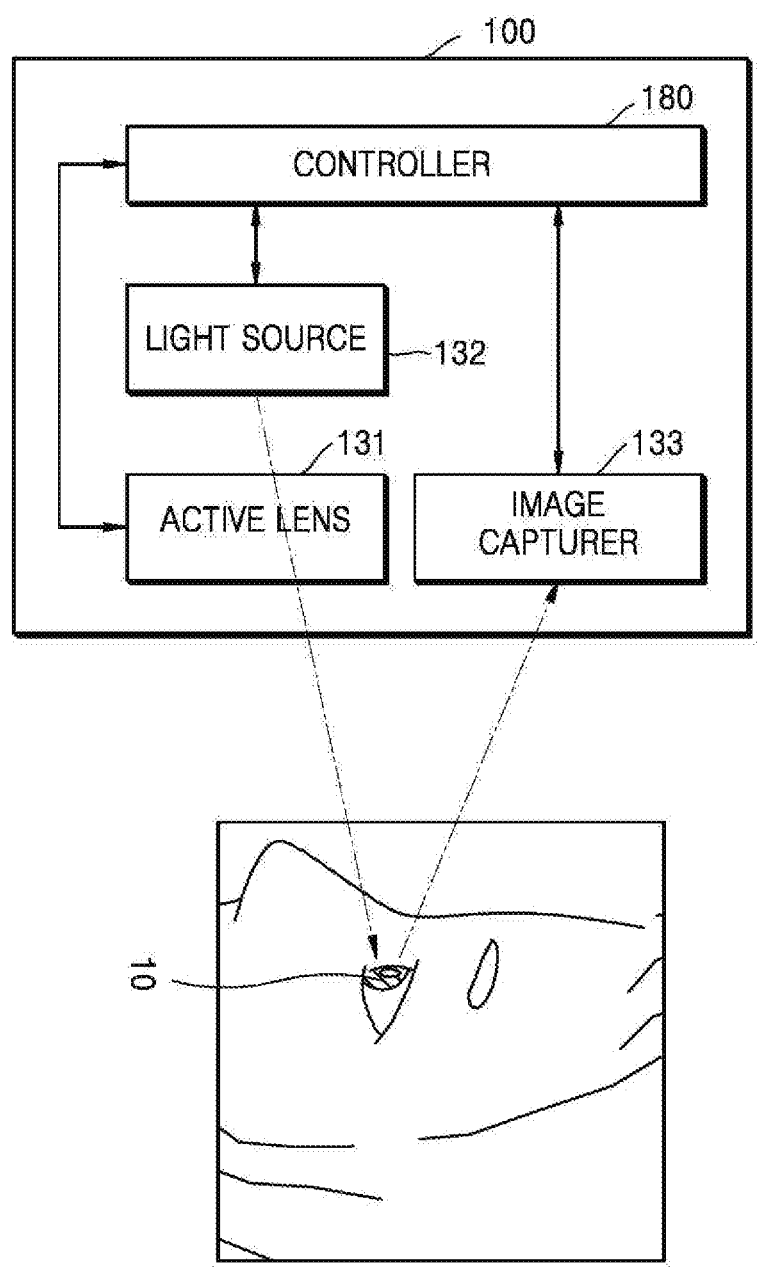

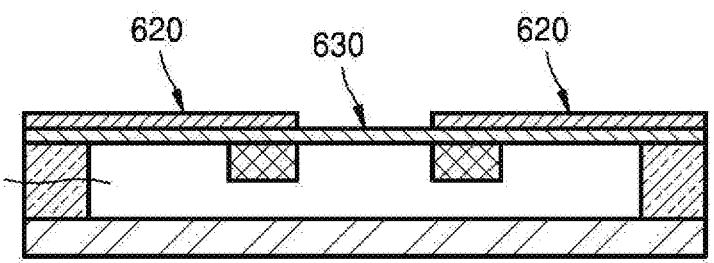
FIG. 6A
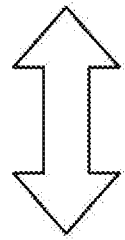
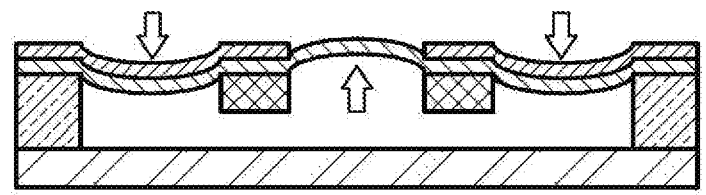
FIG. 6B

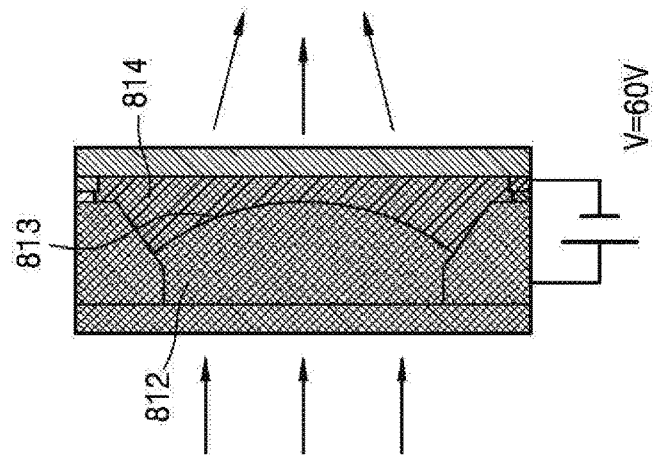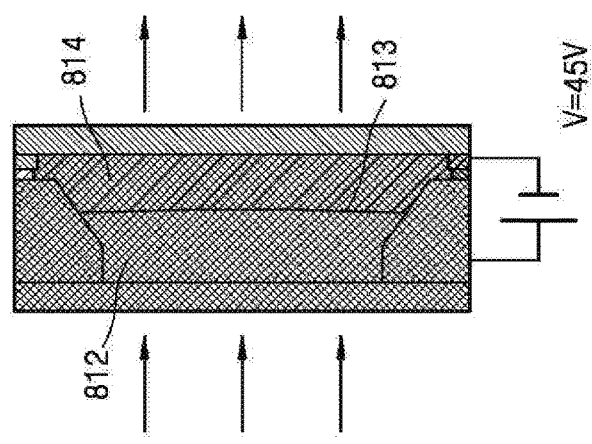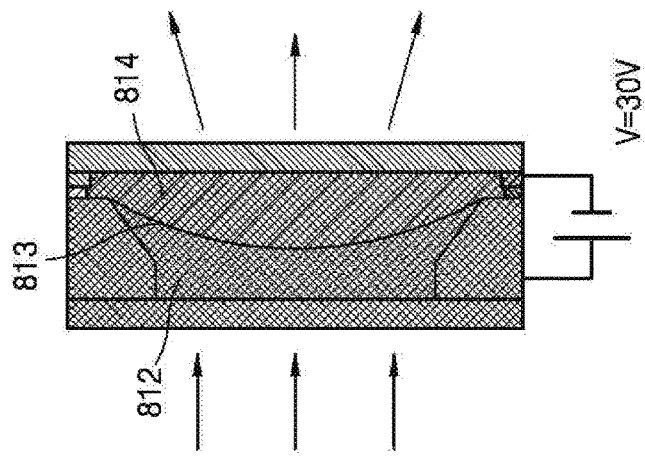

METHOD AND DEVICE FOR IRRADIATING LIGHT FOR PHOTOGRAPHING IRIS

CROSS-REFERENCE TO RELATED APPLICATION(S)

This application claims the benefit under 35 U.S.C. § 119(a) of a Korean patent application filed on Mar. 6, 2015 in the Korean Intellectual Property Office and assigned Serial number 10-2015-0031959, the entire disclosure of which is hereby incorporated by reference.

TECHNICAL FIELD

The present disclosure relates to methods and devices for irradiating light to photograph an iris. More particularly, the present disclosure relates to methods and devices for irradiating a proper amount of light to an iris according to a position of the iris.

BACKGROUND

With advances in multimedia technologies and network technologies, users have been provided with various services using multimedia devices. To use a service, a user may first be authenticated using, for example, a user's detectable iris information. For user authentication using the user's iris information, the iris of the user has to be photographed. To photograph the iris, a sufficient amount of light needs to be provided. Moreover, to obtain a useful image of the iris regardless of a photographing condition, a sufficient amount of light needs to be irradiated to the user's iris.

A device may irradiate a sufficient amount of light to the iris by using a light source that emits a large amount of light. However, when the iris is close to the device, irradiation of such a large amount of light to the eyes of the user may damage the user's eyes or otherwise cause discomfort to the user. Thus, a proper amount of light has to be irradiated to the user's iris.

Therefore, a device that photographs an iris has to irradiate a proper amount of light to a user according to a position of the user and maintain a degree of user comfort.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide methods and devices for effectively irradiating light to an iris of a user by using an active lens.

Another aspect of the present disclosure is to provide methods and devices for adjusting an active lens according to a photographing condition.

In accordance with an aspect of the present disclosure, a device for irradiating light for photographing an iris is provided. The device includes a light source configured to generate light, an active lens configured to have an adjustable refractive index to change the generated light passing through the active lens and irradiated to the iris, an image capturer configured to capture an image of the iris by using a camera and the changed light irradiated to the iris, and a controller configured to control the active lens to change the light irradiated to the iris based on at least one detected photographing condition.

In accordance with another aspect of the present disclosure, a method of obtaining an image of an iris by a device is provided. The method includes generating light by using a light source of the device, controlling an active lens having an adjustable refractive index to change light passing through the active lens and irradiated to the iris based on at least one detected photographing condition, and capturing an image of the iris.

In accordance with another aspect of the present disclosure, a recording medium having recorded thereon a program for executing the method of obtaining an image of an iris by a device is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3 and 4 are block diagrams illustrating a structure of a device according to various embodiments of the present disclosure;

FIGS. 6A and 6B are cross-sectional diagrams of a structure of an active lens using an actuator scheme according to various embodiments of the present disclosure;

FIGS. 8A to 8C are conceptual diagrams of a structure of an active lens using an electro-wetting phenomenon according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Throughout the specification, when a part is "connected" to another part, it means that the part is "directly connected" to another part and is "electrically connected" to another part having another element therebetween. When a part "includes" an element, it means that the part may further include another element, rather than excluding another element, unless specified otherwise.

Hereinafter, the present disclosure will be described in detail with reference to the accompanying drawings.

Figure 1:
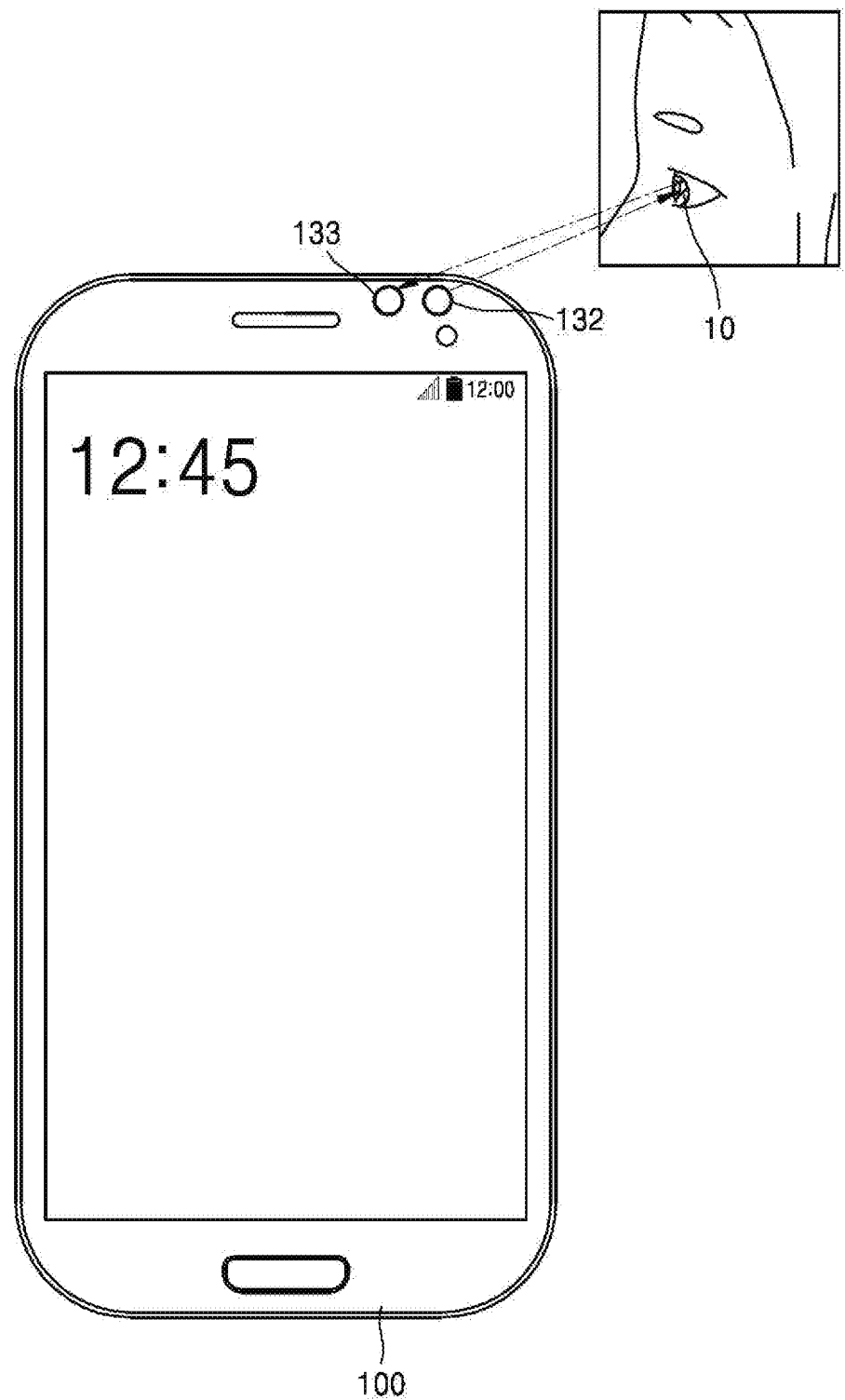
FIG. 1 is a diagram illustrating an example of irradiating light to an iris of a user in order for a device to photograph the user's iris according to various embodiments of the present disclosure.

FIG. 1 is a diagram illustrating an example of irradiating light to an iris of a user to photograph the iris by a device according to various embodiments of the present disclosure.

Referring to FIG. 1, a device 100 is provided that irradiates light to an iris 10 of a user through a light source (i.e., a light-emitting unit) 132 to photograph the user's iris 10. An image capturer (i.e., a light receiving unit) 133 photographs the iris 10. The device 100 adjusts a degree (i.e., a radiation angle at) to which light generated by the light source 132 is radiated, thus adjusting the amount of light arriving at the iris 10.

The iris 10 photographed by the device 100 is used to authenticate a user of the device 100 through iris recognition. Herein, the device 100 authenticates the user to provide a predetermined service. The predetermined service may include any type of services provided by a service provider or the device 100. The service may also include, for example, a broadcasting service, a content sharing service, a content providing service, a power management service, a game providing service, a chatting service, a document generation service, a search service, a call service, a photographing service, a transportation means recommendation service, and a video play service, without being limited thereto.

The device 100 may be, but is not limited to, a smartphone, a tablet personal computer (PC), a PC, a smart television (TV), a cellular phone, a personal digital assistant (PDA), a laptop computer, a media player, a micro server, a global positioning system (GPS), an electronic-book terminal, a digital broadcasting terminal, a navigation system, a kiosk, a moving picture experts group phase 1 or phase 2 (MPEG-1 or MPEG-2) audio layer 3 (MP3) player, a digital camera, an electronic device, or other mobile or non-mobile computing device. The device 100 may be a wearable device having a communication function and a data processing function, such as a watch, glasses, a hairband, a ring, and so forth. However, the device 100 is not limited to the above examples, and may be any type of device capable of irradiating light to a user's iris.

Figure 2A:
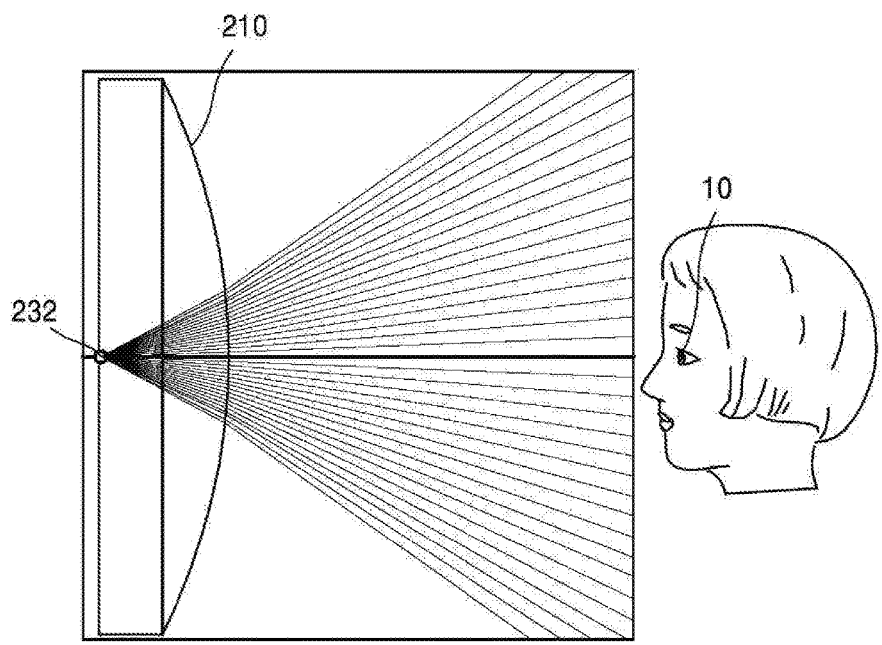
FIGS. 2A and 2B are diagrams for describing an amount of light irradiated to an iris depending on a radiation angle of light, which is adjusted by a lens according to various embodiments of the present disclosure.
Figure 2B:
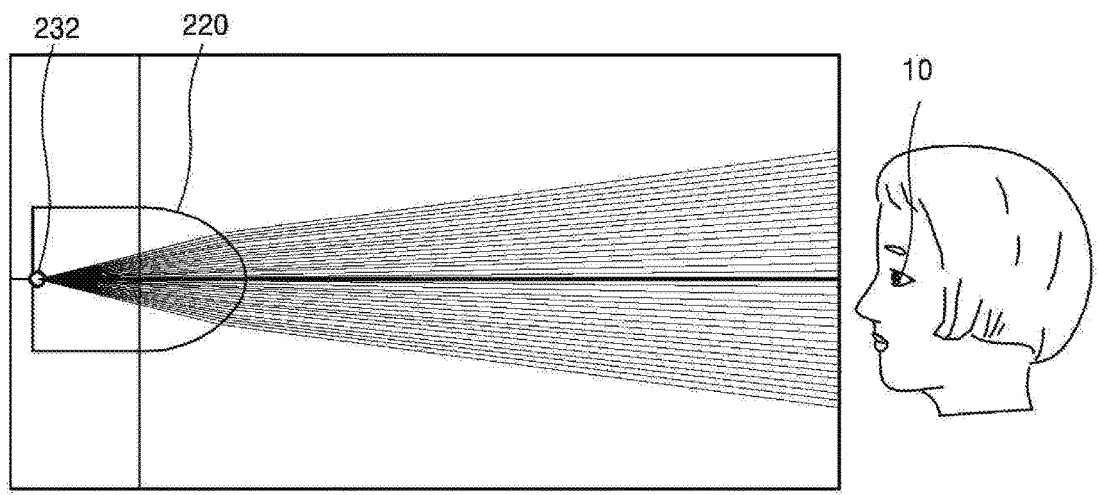

FIGS. 2A and 2B are diagrams for describing an amount of light irradiated to an iris depending on a radiation angle of light, which is adjusted by a lens according to various embodiments of the present disclosure.

If light generated by a light source passes through a lens, the light is bent while passing through the lens. Herein, the radiation angle of the light generated by the light source may vary with a degree (i.e., a refractive index at) to which the light is bent by the lens. For example, the refractive index of the lens may vary with a curvature radius of the lens.

Referring to FIG. 2A, a light radiated from a light source 232 passes through a lens 210 having a large curvature radius (i.e., a small curvature). Referring to FIG. 2A, a small amount of the light passing through the large-curvature radius lens 210 arrives at the user's iris 10 because a broad radiation angle is formed. That is, when the user's iris 10 is close to the light source 232, the amount of light arriving at the iris 10 may be reduced by using the large-curvature radius lens 210.

Referring to FIG. 2B, the light radiated from a light source 232 passes through a lens 220 having a small curvature radius (i.e., a large curvature). Referring to FIG. 2B, an amount of the light passing through the small-curvature radius lens 220, which arrives at the user's iris 10, is increased when compared to the case with the large-curvature radius lens 210, because a narrow radiation angle is formed. That is, when the user's iris 10 is close to the light source 232, the amount of light arriving at the iris 10 may increase using the small-curvature radius lens 220.

However, to reduce the size of the device 100, the device 100 may not be able to include many lenses. Thus, the device 100 may include an active lens 131 as illustrated in FIGS. 3 and 4.

Figure 4:
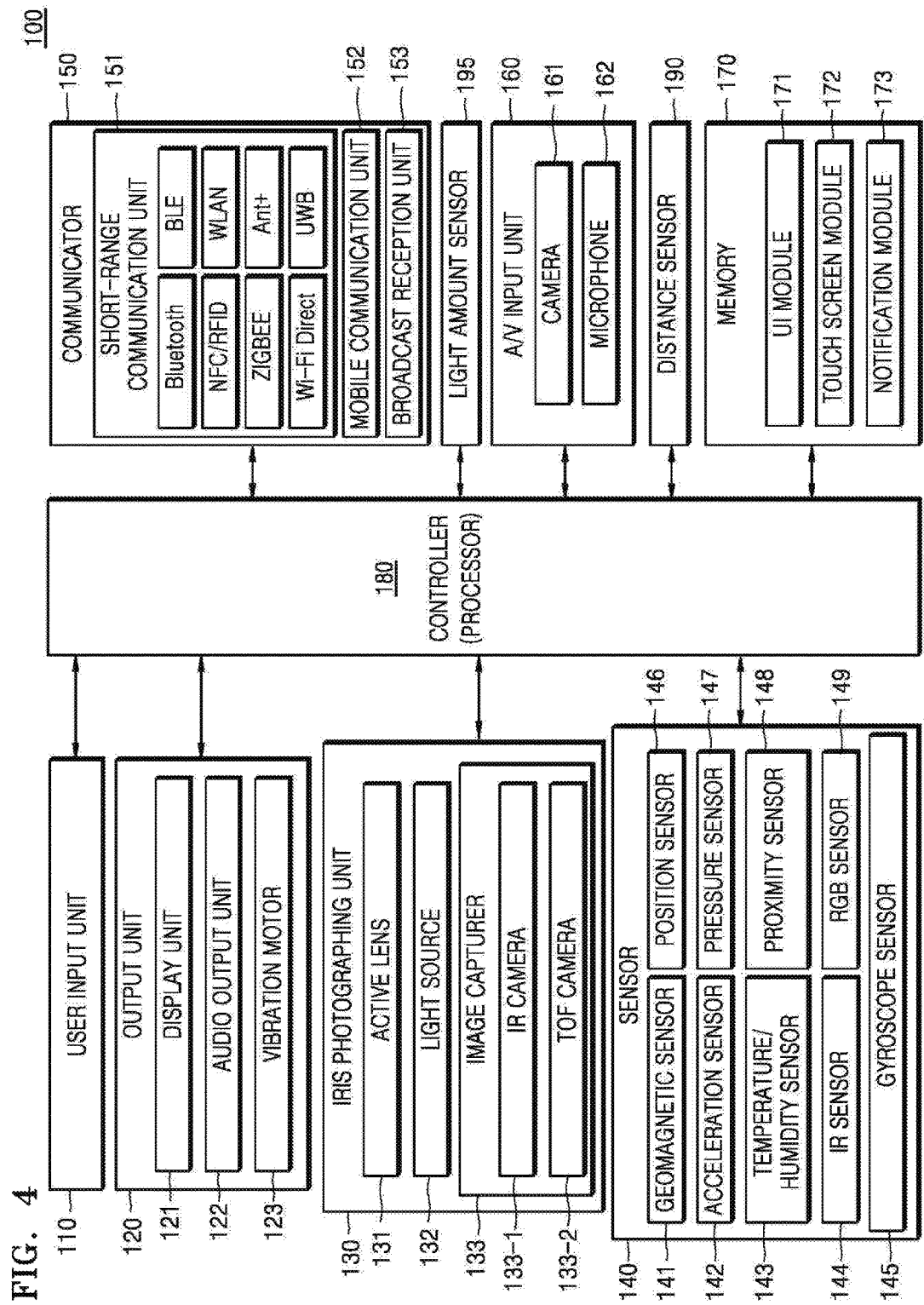

FIGS. 3 and 4 are block diagrams illustrating a structure of a device according to various embodiments of the present disclosure.

Referring to FIG. 3, a device 100 may include a light source 132, an active lens 131, an image capturer 133, and a controller 180. Elements illustrated in FIG. 3 can include both essential and nonessential elements of the device 100. According to various embodiments of the present disclosure, the device 100 may be implemented with a larger or smaller number of elements than the elements shown in FIG. 3.

For example, referring to FIG. 4, a device 100 according to some embodiments may further include a user input unit 110, an output unit 120, a sensing unit 140, a communicator 150, and an audio/video (A/V) input unit 160. For example, an iris photographing unit 130 may include the active lens 131, the light source 132, and the image capturer 133. The image capturer 133 may include at least one of an infrared camera 133-1 and a time-of-flight (TOF) camera 133-2.

The user input unit 110 may denote a unit for inputting data allowing the user to control the device 100. For example, the user input unit 110 may be a key pad, a dome switch, a touch pad (e.g., a capacitive overlay type, a resistive overlay type, an infrared beam type, a surface acoustic wave type, an integral strain gauge type, a piezo electric type, or the like), a jog wheel, a jog switch, or the like, without being limited thereto.

The user input unit 110 receives a user input for using a service provided by the device 100.

The output unit 120 outputs an audio signal, a video signal, or a vibration signal. The output unit 120 may include at least one of a display unit 121, an audio output unit 122, and a vibration motor 123.

The display unit 121 displays and outputs information processed by the device 100. For example, the display unit 121 may display a result of iris recognition with respect to the iris, photographed by the iris photographing unit 130. The display unit 121 may also display a user interface (UI) for using a service provided by the device 100.

When the display unit 121 and a touch pad form a touch screen in a layered structure, the display unit 121 may include at least one of a liquid crystal display (LCD), a thin film transistor (TFT) LCD, an organic light-emitting diode (OLED), a flexible display, a three-dimensional (3D) display, and an electrophoretic display. Depending on the performance of the device 100, the device 100 may include two or more of the display unit 121.

The audio output unit 122 outputs audio data received from the communicator 150 or stored in a memory 170. The audio output unit 122 outputs an audio signal associated with a function (e.g., an incoming call receiving sound, a message receiving sound, an alarm sound, or the like) performed by the device 100. The audio output unit 122 may include a speaker or a buzzer, but embodiments are not limited thereto.

The vibration motor 123 outputs a vibration signal. For example, the vibration motor 123 may output a vibration signal corresponding to outputting of audio data or video data (e.g., a call signal receiving sound, a message receiving sound, or the like). The vibration motor 123 can also output a vibration signal if a touch input is received through a touch screen.

The iris photographing unit 133 photographs the iris 10 of the user under control of the controller 180. The iris photographing unit 133 may include the active lens 131, the light source 132, and the image capturer 133.

The active lens 131 may include at least one lens that is capable of adjusting a refractive index to change light passing through the active lens 131 under control of the controller 180. For example, the active lens 131 may include at least one of a liquid crystal lens, a lens using an actuator scheme, a membrane lens, and an electro-wetting lens. That is, the device 100 can be controlled to cause the light passing through the active lens 131 to change as directed by the controller 180.

The light source 132 generates light as directed by the controller 180. For example, the light source 132 may include, but is not limited to, an infrared emitting diode (IRED) or a visible LED. The light generated by the light source 132 may be irradiated to the iris 10 after passing through the active lens 131.

The image capturer 133 images the user's iris 10 as directed by the controller 180. For example, the image capturer 133 may include, but is not limited to the infrared camera 133-1.

Depending on capabilities of the device 100, the device 100 may further include a distance sensing unit 190. For example, if the device 100 includes the TOF camera 133-2, the distance sensing unit 190 may determine a distance to the user's iris 10 from the device 100 by using the TOF camera 133-2. In this case, the distance sensing unit 190 may include the TOF camera 133-2 of the image capturer 133. In another example, the distance sensing unit 190 may determine a distance to the user's iris 10 from the device 100 based on the iris 10 image-captured by the image capturer 133. More specifically, the distance sensing unit 190 detects a pupil from an image of the iris 10 captured by image capturer 133. The distance sensing unit 190 calculates a distance from the device 100 to the iris 10 based on a size of the detected pupil. That is, if the size of the detected pupil is large, the distance sensing unit 190 determines that a distance from the device 100 to the user's iris 10 is short. If the size of the detected pupil is small, the distance sensing unit 190 determines that the distance from the device 100 to the user's iris 10 is long. In this case, the distance sensing unit 190 may be included in the controller 180.

Depending on capabilities of the device 100, the device 100 may further include a light amount sensing unit 195. For example, the light amount sensing unit 195 may sense the amount of infrared light around the device 100 by using the infrared camera 133-1 or an infrared sensor 144. In another example, the light amount sensing unit 195 senses the amount of visible light around the device 100 by using a camera 161 or a red, green, and blue (RGB) sensor 149.

The sensing unit 140 may include, but is not limited to, at least one of a geomagnetic sensor 141, an acceleration sensor 142, a temperature/humidity sensor 143, the IR sensor 144, a gyroscope sensor 145, a position sensor (e.g., a GPS) 146, a pressure sensor 147, a proximity sensor 148, and the RGB illumination sensor 149. A function of each sensor may be intuitively induced from a name of the sensor, and thus will not be described in additional detail.

The communicator 150 may include one or more elements for performing communication with an external device or network (not illustrated). For example, the communicator 150 may include at least one of a short-range wireless communicator 151, a mobile communicator 152, and a broadcast reception unit 153.

The short-range wireless communicator 151 may include, but is not limited to, a Bluetooth communicator, a Bluetooth low energy (BLE) communicator, a near field communication (NFC) unit, a wireless local area network (WLAN) (or Wi-Fi) communicator, a Zigbee communicator, an IR data association (IrDA) communicator, a Wi-Fi direct (WFD) communicator, an ultra wideband (UWB) communicator, and an Ant+ communicator.

The mobile communicator 152 transmits a wired or wireless signal to and receives a wired or wireless signal from at least one of a base station, an external terminal, and a server on a mobile communication network. Herein, the wired or wireless signal may include data in various forms according to transmission and reception of a voice call signal, a video call signal, or a text/multimedia message.

The broadcast reception unit 153 receives a broadcast signal and/or broadcast-related information from outside the device through a broadcast channel. The broadcast channel may include a satellite channel, a terrestrial channel, or the like. According to implementation, various embodiments of the device 100 may not include the broadcast reception unit 153.

The A/V input unit 160 is used to input an audio signal or a video signal, and may include the camera 161 and a microphone 162. The camera 161 obtains an image frame of a still image or a moving image through an image sensor in a video call mode or a photographing mode. An image captured by the image sensor may be processed by the controller 180 or a separate image processing unit (not illustrated).

The image frame processed by the camera 161 is stored in the memory 170 or transmitted from the device through the communicator 150. According to a structural aspect of the terminal, two or more cameras 161 may be provided. The camera 161 may be included in the image capturer 133 or may be implemented separately from the image capturer 133.

The microphone 162 receives an external audio signal and processes the received audio signal into electric voice data, such as digital voice data. For example, the microphone 162 may receive an audio signal from an external device or a speaker. The microphone 162 may use various noise cancellation algorithms for canceling noise generated during the reception of the external audio signal.

The memory 170 and may include at least one type of storage media, such as a flash memory type, a hard disk type, a multimedia card micro type, a card-type memory (e.g., a secure digital (SD) or extreme digital (XD) memory), random access memory (RAM), a static RAM (SRAM), a read-only memory (ROM), an electrically erasable programmable ROM (EEPROM), a programmable ROM (PROM), a magnetic memory, a magnetic disk, and an optical disk.

Programs stored in the memory 170 may be classified into a plurality of modules depending on functions thereof, and may be classified into, for example, a UI module 171, a touch screen module 172, and a notification module 173.

The UI module 171 may provide a specified UI or GUI operating with the device 100 application-by-application. The touch screen module 172 senses a touch gesture on a user's touch screen, and delivers information about the touch gesture to the controller 180. The touch screen module 172 according to some embodiments also recognizes and analyzes a touch code. The touch screen module 172 may be configured as separate hardware including a dedicated controller.

To sense a touch or a proximity touch (i.e., hovering) on the touch screen, various sensors may be provided inside or near the touch screen. As an example of a sensor for sensing a touch on the touch screen, a tactile sensor may be provided. The tactile sensor refers to a sensor for sensing a contact of a particular object to the extent or more that a person may feel the contact. The tactile sensor may sense various information such as roughness of a contact surface, rigidity of the contacting object, and a temperature of a contact point.

A proximity sensor may be an example of sensing a touch on the touch screen.

The proximity sensor refers to a sensor for detecting existence or absence of an object approaching a predetermined detection surface or a nearby object by using a force of an electromagnetic field or IR rays without a mechanical contact. Examples of a proximity sensor may include a transmissive optoelectronic sensor, a direct reflective optoelectronic sensor, a mirror reflective optoelectronic sensor, a high-frequency oscillation proximity sensor, a capacitive proximity sensor, a magnetic proximity sensor, an IR proximity sensor, and so forth. The user's touch gesture may include a tap, a touch & hold, a double tap, a drag, panning, a flick, a drag & drop, a swipe, and so forth.

The notification module 173 generates a signal for notifying of an occurrence of an event of the device 100. Examples of the event occurring in the device 100 may include call signal reception, message reception, key signal input, schedule notification, and so forth. The notification module 173 outputs a notification signal in the form of a video signal through the display unit 121, in the form of an audio signal through the audio output unit 122, and/or in the form of a vibration signal through the vibration motor 123.

The controller 180 controls an overall operation of the device 100. For example, the controller 180 may control the user input unit 110, the output unit 120, the iris photographing unit 130, the sensing unit 140, the communicator 150, the A/V input unit 160, and the memory 170.

More specifically, the controller 180 can adjust a refractive index of an active lens to change light being generated from a light source and passing through the active lens 131 by controlling one or more of the light source and the active lens 131. For example, the controller 180 may control the active lens 131 based on a distance of the iris 10, an amount of light near the device 100, and motion of the device 100.

According to an embodiment, where the iris 10 is a short distance from the device 100, as sensed for example by the distance sensing unit 190, the controller 180 controls the active lens 131 such that a small amount of light generated by the light source 132 arrives at the iris 10. However, where the iris 10 is a long distance from the device 100, as sensed for example by the distance sensing unit 190, the controller 180 controls the active lens 131 such that the light generated by the light source 132 is collected, or a focus is formed, at a position of the iris 10.

In another embodiment, if a large amount of ambient or environmental light is sensed by a light amount sensing unit 195, the controller 180 controls the active lens 131 such that a small amount of light generated by the light source 132 arrives at the iris 10. However, if a small amount of ambient or environmental light is sensed by the light amount sensing unit 195, the controller 180 controls the active lens 131 such that the light generated by the light source 132 is collected, or a focus is formed, at the position of the iris 10.

In another embodiment, if a large amount of motion of the device 100 is sensed by the sensing unit 140, the controller 180 controls the active lens 131 such that light generated from the light source 132 arrives in a broad range (i.e., controls the active lens 131 such that a radiation angle of light passing through the active lens 131 is large). In this case, the controller 180 controls the light source 132 such that an amount of light generated by the light source 132 increases, allowing a sufficient amount of light to arrive at the iris 10 with the increase in the radiation angle of the light. However, if little or no motion of the device 100 is sensed by the sensing unit 140, the controller 180 controls the active lens 131 such that the light generated by the light source 132 arrives at the position of the iris 10 (i.e., controls the active lens 131 such that the radiation angle of the light passing through the active lens 131 is small). According to various embodiments of the present disclosure, the detected motion may be relative between the device 100 and iris 10. That is, detected motion may include motion of the device 100, motion of the iris 10, or a combination of motion of the device 100 and the iris 10.

The controller 180 controls the active lens 131 based on a combination of a distance to the iris 10, an amount of light around the device 100, and motion of the device 100.

Criteria for controlling the active lens 131 according to the distance to the iris 10, the amount of light around the device 100, and the motion of the device 100 may be preset or dynamically determined at the time.

Figure 5A:
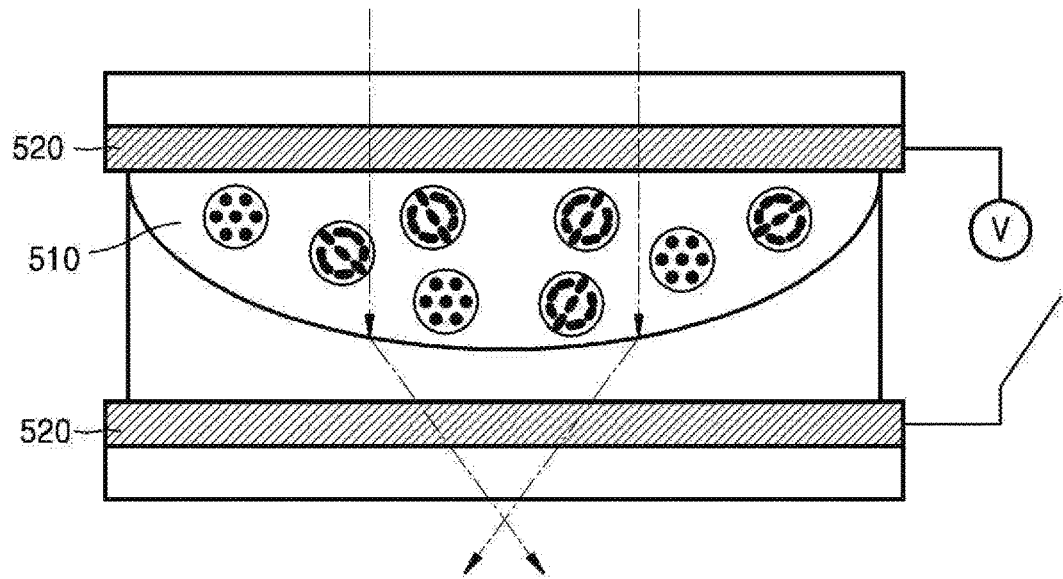
FIGS. 5A and 5B are conceptual diagrams of a structure of an active lens using liquid crystal according to various embodiments of the present disclosure.
Figure 5B:
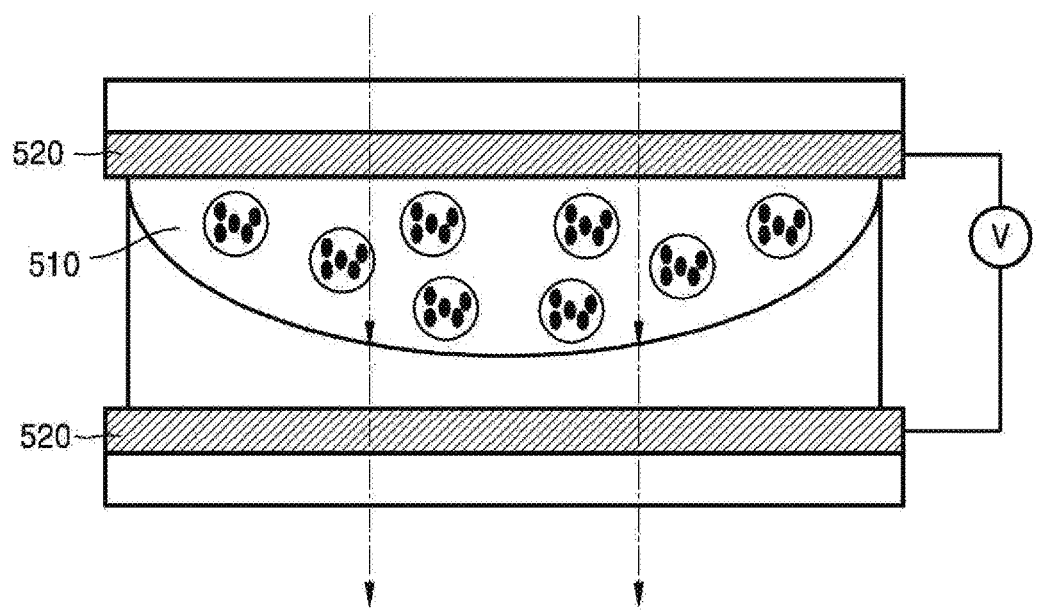

FIGS. 5A and 5B are conceptual diagrams of a structure of an active lens using liquid crystal (i.e., a liquid crystal lens) according to various embodiments of the present disclosure.

A refractive index of a liquid crystal lens may be adjusted using characteristics of materials of the liquid crystal included in the liquid crystal lens. By applying a voltage to the materials of the liquid crystal included in the liquid crystal lens, positions and directions of the materials of the liquid crystal of the liquid crystal lens may be adjusted and a refractive index of the liquid crystal lens may be accordingly adjusted.

Referring to FIGS. 5A and 5B, a liquid crystal lens may include liquid crystals 510 and a transparent conductive layer (e.g., indium tin oxide (ITO)) 520. The device 100 may adjust the refractive index of the liquid crystal lens by applying a voltage V to the transparent conductive layers 520.

FIGS. 6A and 6B are cross-sectional diagrams of a structure of an active lens using an actuator scheme according to various embodiments of the present disclosure.

Referring to FIG. 6A, an active lens using an actuator scheme may include a fluid 610 filled in the active lens, a thin film 630 for forming a lens portion, and a pressurizing portion 620 for pressurizing the fluid 610.

Referring to FIG. 6B, once a pressure is applied to the pressurizing portion 620, the pressure is delivered to the thin film 630 by the displaced fluid 610, such that the form of the thin film 630 is changed. According to the changed form of the thin film 630, a refractive index can be adjusted to change light passing through the fluid 610 and the thin film 630.

Figure 7A:
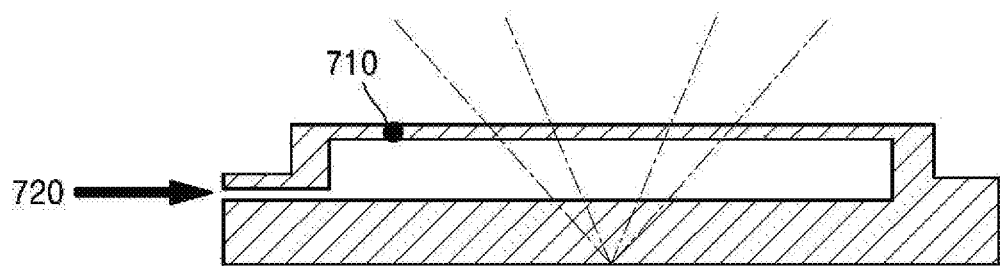
FIGS. 7A and 7B are cross-sectional diagrams of a structure of an active lens using a membrane of a micro fluid pump type according to various embodiments of the present disclosure.
Figure 7B:
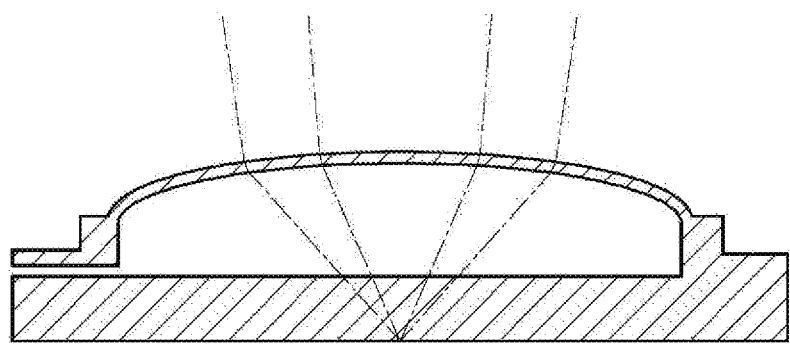

FIGS. 7A and 7B are cross-sectional diagrams of a structure of an active lens using a membrane of a micro fluid pump type according to various embodiments of the present disclosure.

Referring to FIG. 7A, in a membrane lens, a lens portion may be formed using a thin film 710. Herein, if a fluid pump injects a fluid into the lens through a fluid port 720, the form (i.e., a curvature) of the thin film 710 is changed by the pressure as illustrated in FIG. 7B. As the form of the exterior of the lens is changed, a refractive index can be adjusted to change light passing through the lens.

FIGS. 8A to 8C are conceptual diagrams of a structure of an active lens using an electro-wetting phenomenon according to various embodiments of the present disclosure.

For an electro-wetting lens, characteristics of the lens may be adjusted by changing a form of an interfacial surface between fluids forming the electro-wetting lens.

Referring to FIGS. 8A, 8B and 8C, characteristics of the electro-wetting lens may be adjusted by changing a form of an interfacial surface 813 between two fluids 812 and 814 forming the electro-wetting lens. The fluids 812 and 814 forming the electro-wetting lens may be conductive fluids. By applying a predetermined voltage V to the fluids 812 and 814 forming the electro-wetting lens, a surface tension of the fluids 812 and 814 may be manipulated or removed. Thus, a curvature of the interfacial surface 813 between the two fluids 812 and 814 forming the electro-wetting lens may be changed, and the refractive index of the electro-wetting lens may be adjusted.

For example, referring to FIG. 8A, if a voltage V of 30V is applied to the fluids 812 and 814, the electro-wetting lens may have the same refractive index as a concave lens according to the form of the interfacial surface 813. Referring to FIG. 8B, if a voltage V of 45V is applied to the fluids 812 and 814, the electro-wetting lens may have the same refractive index as a flat lens according to the form of the interfacial surface 813. Referring to FIG. 8C, if a voltage V of 60V is applied to the fluids 812 and 814, the electro-wetting lens may have the same refractive index as a convex lens according to the form of the interfacial surface 813.

Figure 9:
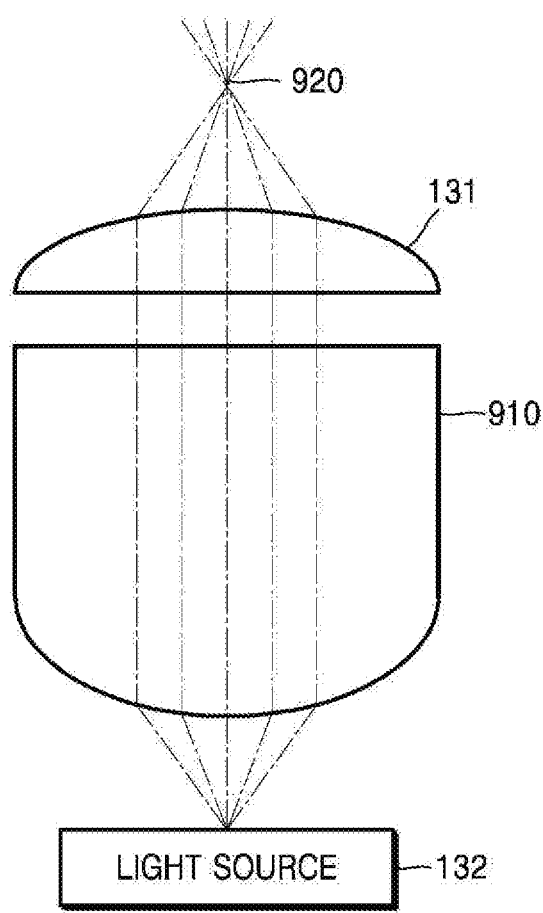
FIG. 9 is a conceptual diagram of a structure of a device including a parabolic lens according to various embodiments of the present disclosure.

FIG. 9 is a conceptual diagram for describing a structure of a device including a parabolic lens according to various embodiments of the present disclosure.

Referring to FIG. 9, a device 100 may include a parabolic lens 910 to form a radiation plane of light generated by a light source 132. According to various embodiments of the present disclosure, the parabolic lens 910 may be replaced with a parabolic mirror in which the light source 132 is disposed.

As shown in FIG. 9, the light generated by the light source 132 passes through the parabolic lens 910, thus being incident to the active lens 131 while forming the radiation plane. In this case, the device 100 controls the refractive index of the active lens 131 such that a focus or focal point 920 is formed at a proper position according to the distance from the device 100 to the user's iris 10.

Figure 10:
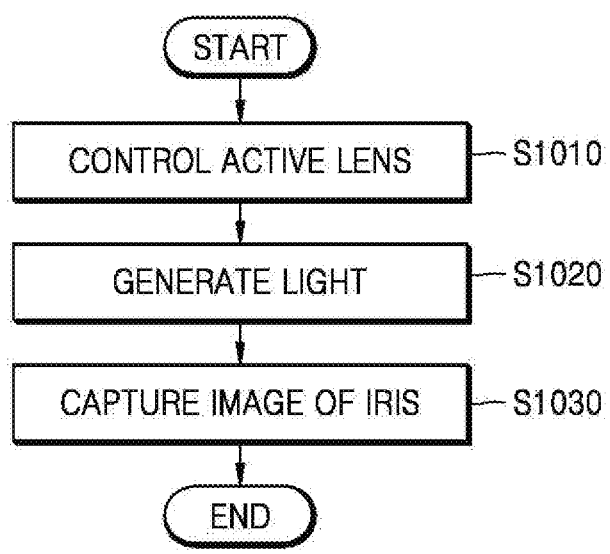
FIG. 10 is a flowchart of a process of photographing an iris by a device according to various embodiments of the present disclosure.

FIG. 10 is a flowchart of a process of photographing an iris by a device according to various embodiments of the present disclosure.

Referring to FIG. 10, in operation S1010, a device 100 controls an active lens 131. The device 100 adjusts the refractive index to change the light passing through the active lens 131 by controlling the active lens 131 as described above. The device 100 controls the active lens 131 based on various parameters according to an embodiment. The parameters that may be used to control the active lens 131 may include, but are not limited to, a distance from the device 100 to the iris 10, an amount of light around the device 100, and motion of the device 100.

According to various embodiments, in operation S1010, the device 100 may determine the distance from the device 100 to the iris 10. The distance from the device 100 to the iris 10 may be determined in various ways. For example, the device 100 may determine the distance from the device 100 to the iris 10 based on a time taken for light radiated from the device 100 to be reflected and return from the iris 10 by using the TOF camera 133-2. The device 100 determines the time taken for the light to be reflected and return from the iris 10 based on a phase difference of the light by using the TOF camera 133-2. In another example, the device 100 images the iris 10 and detects a size or a pupil of the iris 10 from an image of the iris 10 captured by the image capturer 133. The device 100 calculates the distance from the device 100 to the iris 10 from the detected size of the iris 10 or a size of the detected pupil of the iris 10. That is, if the size of the image-captured iris 10 or the size of the detected pupil of the image-captured iris 10 is large, the device 100 may determine that the distance from the device 100 to the user's iris 10 is short. However, if the size of the image-captured iris 10 or the size of the detected pupil of the image-captured iris 10 is small, the device 100 may determine that the distance from the device 100 to the user's iris 10 is long.

Once the distance from the device 100 to the iris 10 is determined, the device 100 controls the active lens 131 according to the determined distance. For example, if the determined distance is long, the device 100 may control the active lens 131 such that a radiation angle of light passing through the active lens 131 is formed to be small. However, if the determined distance is short, the device 100 may control the active lens 131 such that a radiation angle of the light passing through the active lens 131 is formed to be large. However, the present disclosure is not limited to the above examples.

In other various embodiments, in operation S1010, the device 100 may determine the amount of light around the device 100 (i.e., ambient or environmental light). For example, the device 100 may sense the amount of IR rays around the device 100 by using the IR camera 133-1 or the IR sensor 144. In another example, the device 100 may sense the amount of visible rays around the device 100 by using the camera 161 or the RGB sensor 149. Once the amount of light around the device 100 is determined, the device 100 controls the active lens 131 according to the determined amount of light. For example, if the determined amount of light is small, the device 100 may control the active lens 131 such that a radiation angle of the light passing through the active lens 131 is formed to be small. On the other hand, if the determined amount of light is large, the device 100 may control the active lens 131 such that the radiation angle of the light passing through the active lens 131 is formed to be large. However, the present disclosure is not limited to the above example.

In other various embodiments, in operation S1010, the device 100 controls the active lens 131 according to motion of the device 100. For example, if it is determined that a pattern of the motion of the device 100 falls beyond a radiation range of light passing through the active lens 131 (e.g., the amount of motion is large), then the device 100 controls the active lens 131 such that a radiation angle of light passing through the active lens 131 is formed to be large. However, if there is little or no motion of the device 100, the device 100 controls the active lens 131 such that the radiation angle of light passing through the active lens 131 is formed to be small. However, the present disclosure is not limited to these examples.

The device 100 controls the active lens 131 based on at least one, or a combination, of the distance to the iris 10, the amount of light around the device 100, and motion of the device 100.

In operation S1020, the device 100 generates light by using the light source 132. Herein, the light generated by the light source 132 may include light of a visible field and/or light of an IR field, but the present disclosure is not limited to these examples. In other various embodiments, the device 100 generates a variable light by using the light source 132.

As the light generated by the light source 132 passes through the active lens 131 and is irradiated to the iris 10, the device 100 images the capture of the image of the iris 10 in operation S1030. If the captured image is insufficient, the operations of FIG. 10 can be repeated.

Figure 11:
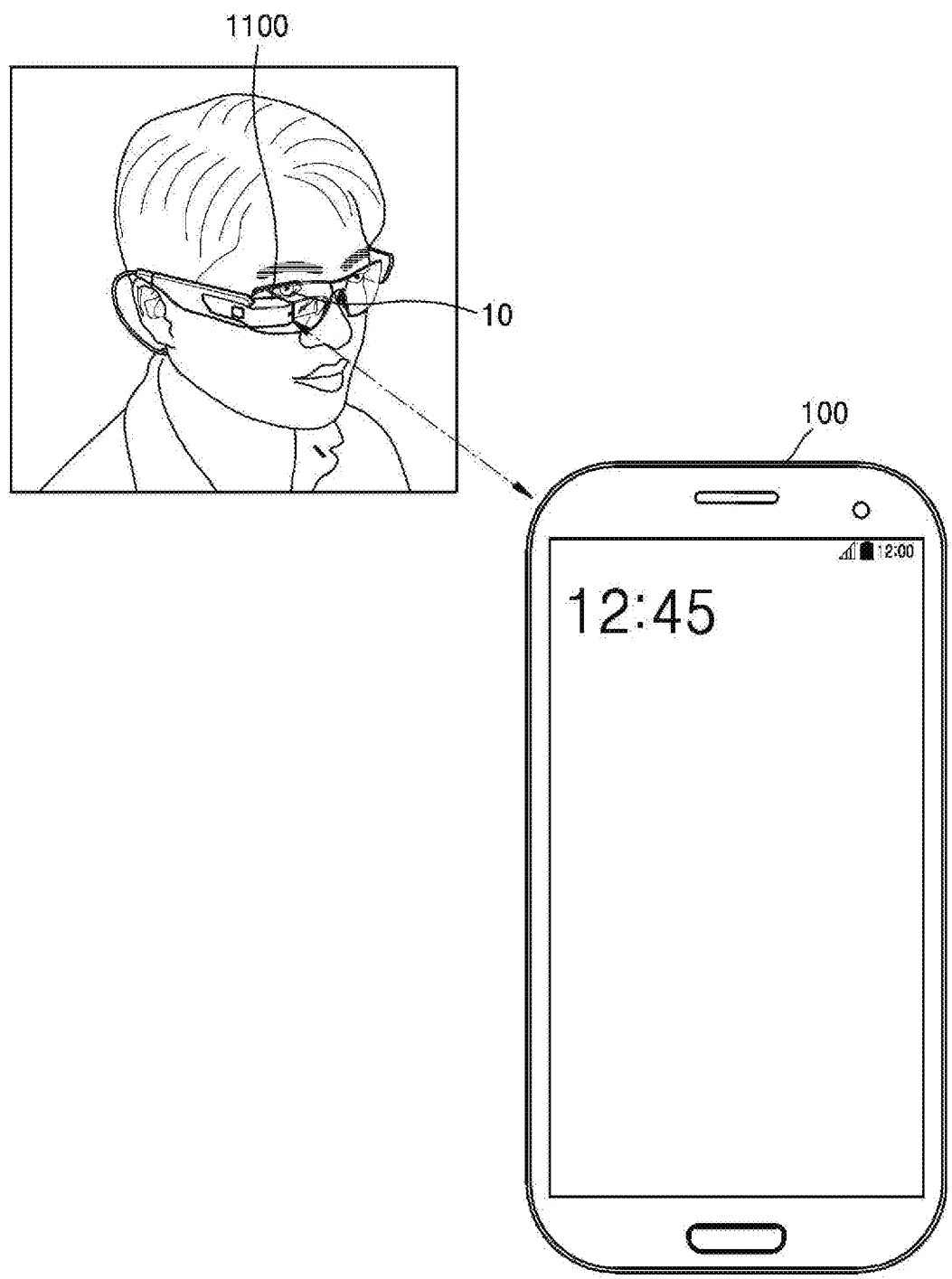
FIG. 11 is a diagram of an example of irradiating light using an external device according to an embodiment of the present disclosure.

FIG. 11 is a diagram of an example of irradiating light using an external device according to an embodiment of the present disclosure.

According to various embodiments, if the iris 10 is at a position where it is difficult for a sufficient amount of light to irradiate to the iris 10 with capabilities of the iris photographing unit 130 included in the device 100, then the device 100 further irradiates light to the iris 10 by using an external device 1100. Herein, the external device 1100 may include an arbitrary device capable of communicating with the device 100 and irradiating light to the iris 10. For example, the external device 1100 may be, but is not limited to, a smartphone, a tablet PC, a PC, a smart TV, a cellular phone, a PDA, a laptop computer, a media player, a micro server, a GPS device, an e-book terminal, a digital broadcasting terminal, a navigation system, a kiosk, an MP3 player, a digital camera, a home appliance, and mobile or non-mobile computing devices.

Referring to FIG. 11, the external device 1100 may be a wearable device having a communication function and a data processing function, such as a watch, glasses, a hairband, a ring, or the like. The external device 1100 communicates with the device 100 and as directed, provides a sufficient amount of light to irradiate to the iris 10. According to various embodiments, the external device 1100 can be provided with a light source and/or active lens as described above.

Figure 12:
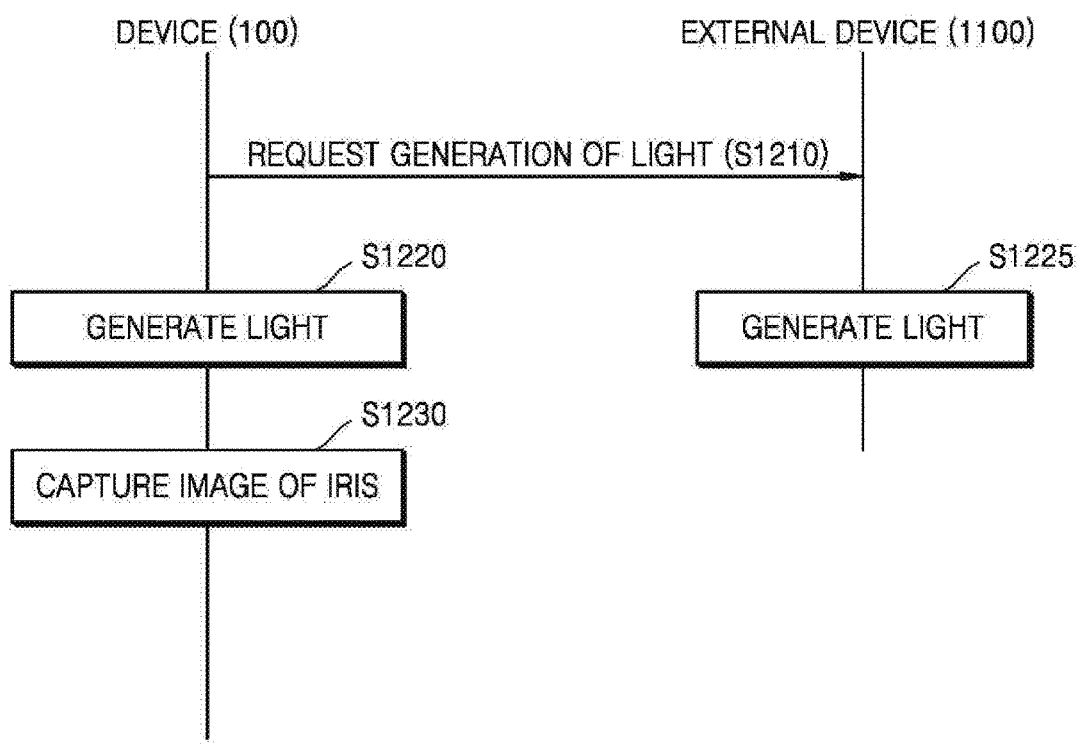
FIG. 12 is a flowchart of a process of irradiating light using an external device according to an embodiment of the present disclosure.

FIG. 12 is a flowchart of a process of irradiating light using an external device according to an embodiment of the present disclosure.

Referring to FIG. 12, a device 100 determines whether to request an external device 1100 to generate light. In operation S1210, the device 100 requests the external device 1100 to generate light based on a result of the determination. For example, if the distance from the device 100 to the iris 10 is determined by the distance sensing unit 190, the controller 180 of the device 100 may determine whether the distance from the device 100 to the iris 10 is greater than a threshold value. Herein, the threshold value may be a preset value according to an embodiment or may be a value set by the user of the device 100. If the distance from the device 100 to the iris 10 is greater than the threshold value, the device 100 may request the external device 1100 to generate light through the communicator 150.

In another example, if the amount of light around the device 100 is sensed by the light amount sensing unit 195, the controller 180 of the device 100 may determine whether the sensed amount of light is smaller than a threshold value. Herein, the threshold value may be a preset value according to an embodiment, or may be a value set by the user of the device 100. If the sensed amount of light is smaller than the threshold value, the device 100 may request the external device 1100 to generate light through the communicator 150.

If the distance is greater than the threshold value and the amount of light is smaller than the threshold value, the device 100 requests the external device 1100 to generate light through the communicator 150. Herein, the threshold value for the distance and the threshold value for the amount of light may be values independent of each other.

In operation S1210, the device 100 searches for the external device 1100 by using short-range wireless communication. For example, the device 100 searches for a plurality of devices capable of performing short-range wireless communication connection. The device 100 selects a device capable of irradiating light to the iris 10 from among the found devices. That is, information about the type of an external device may be received through short-range wireless communication, and a proper type of an external device (e.g., a head mounted display (HMD) device or an external light-emitting device) may be selected based on the received information.

In operation S1225, the external device 1100 generates light according to the request received in operation S1210. According to some embodiments, in operation S1210, the request received by the external device 1100 may include information about a point in time to generate light. In this case, the device 1100 may generate light at the point in time to generate the light, included in the received request. In operation S1220, the device 100 may also generate the light at the point in time included in the request transmitted to the external device 1100 but may not be required to do so. Depending on an embodiment, operation S1220 may be omitted.

Thereafter, based on the light generated by at least one of the device 100 and the external device 1100 in operations S1220 and S1225, the device 100 may capture the image of the iris 10 in operation S1230.

Figure 13:
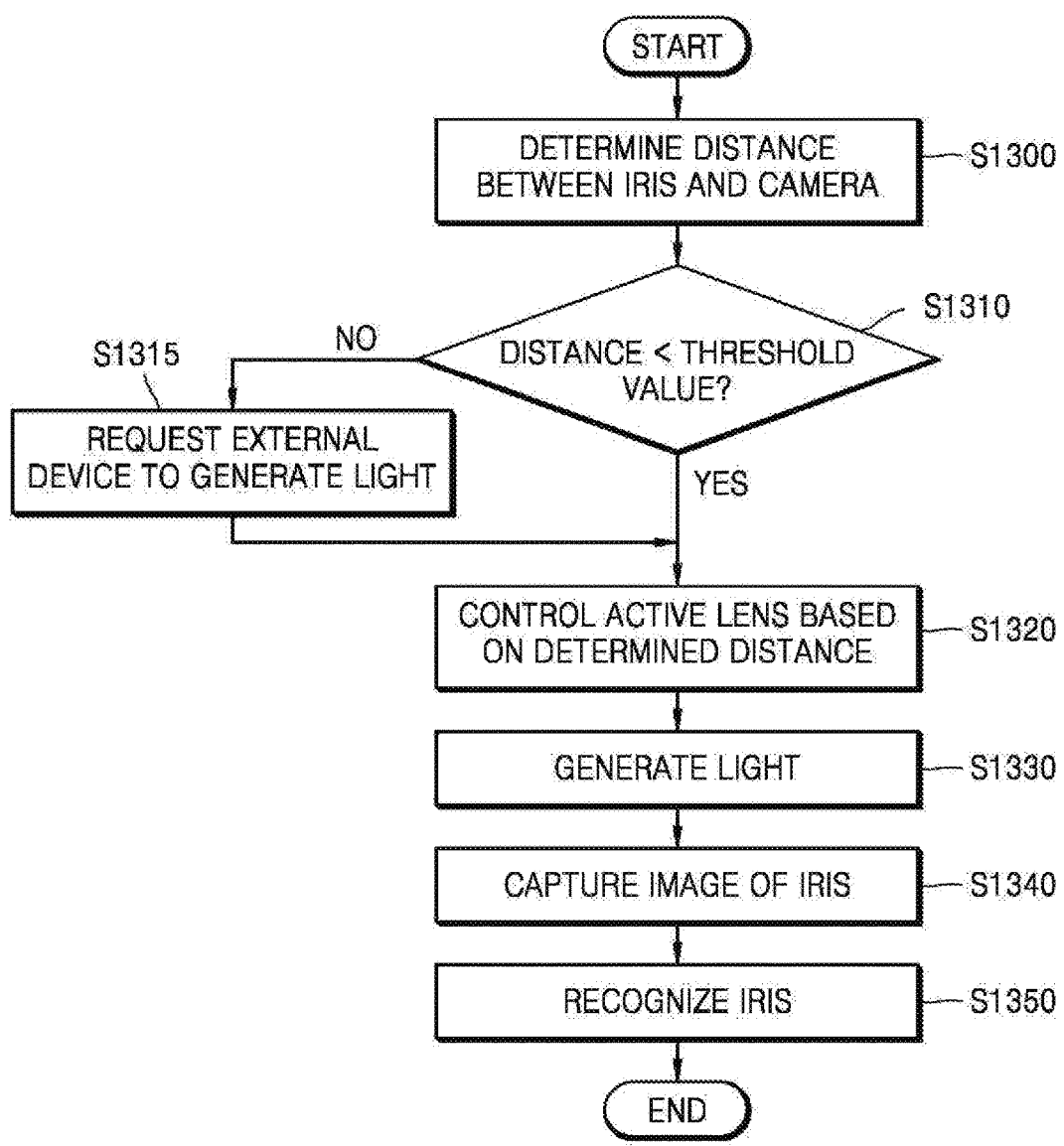
FIG. 13 is a flowchart of a process of controlling an active lens based on a distance according to an embodiment of the present disclosure.

FIG. 13 is a flowchart of a process of controlling an active lens based on a distance according to an embodiment of the present disclosure.

Referring to FIG. 13, in operation S1300, a device 100 determines a distance between an iris 10 and a camera of the device 100. Herein, the camera may include at least one of the IR camera 133-1, the TOF camera 133-2, and the camera 161.

Thereafter, in operation S1310, the device 100 determines whether the distance determined in operation S1300 is less than a threshold value. If the determined distance is less than the threshold value, the device 100 controls the active lens 131 based on the determined distance in operation S1320.

If the determined distance is not less than the threshold value, the device 100 requests the external device 1100 to generate light in operation S1315. The device 100 controls the active lens 131 based on the determined distance in operation S1320.

In operation S1330, the device 100 generates light through the light source 132 but may not be required to do so. Depending on an embodiment, operation S1330 may be omitted. In operation S1340, the device 100 captures the image of the iris 10 by using light generated by at least one of the device 100 and the external device 1100.

In operation S1350, the device 100 performs iris recognition based on the image of the iris 10 captured by the image capturer 133. The iris recognition denotes a technique and/or an authentication system for recognizing a person by using iris information of one or more eyes of the person, which have unique characteristics from person to person. That is, the iris recognition denotes a process of analyzing a shape and/or a color of an iris, the morpheme of capillaries of a retina, and so forth, to identify a person. To perform iris recognition, the device 100 codes a pattern of the iris 10, compares the coded pattern with an iris code registered in a database, and determines whether the coded pattern matches the registered iris code. The device 100 provides a service to the user by using iris recognition. For example, the device 100 identifies the user by using iris recognition, and unlocks the device 100 or performs a payment process if user authentication is successful.

Figure 14:
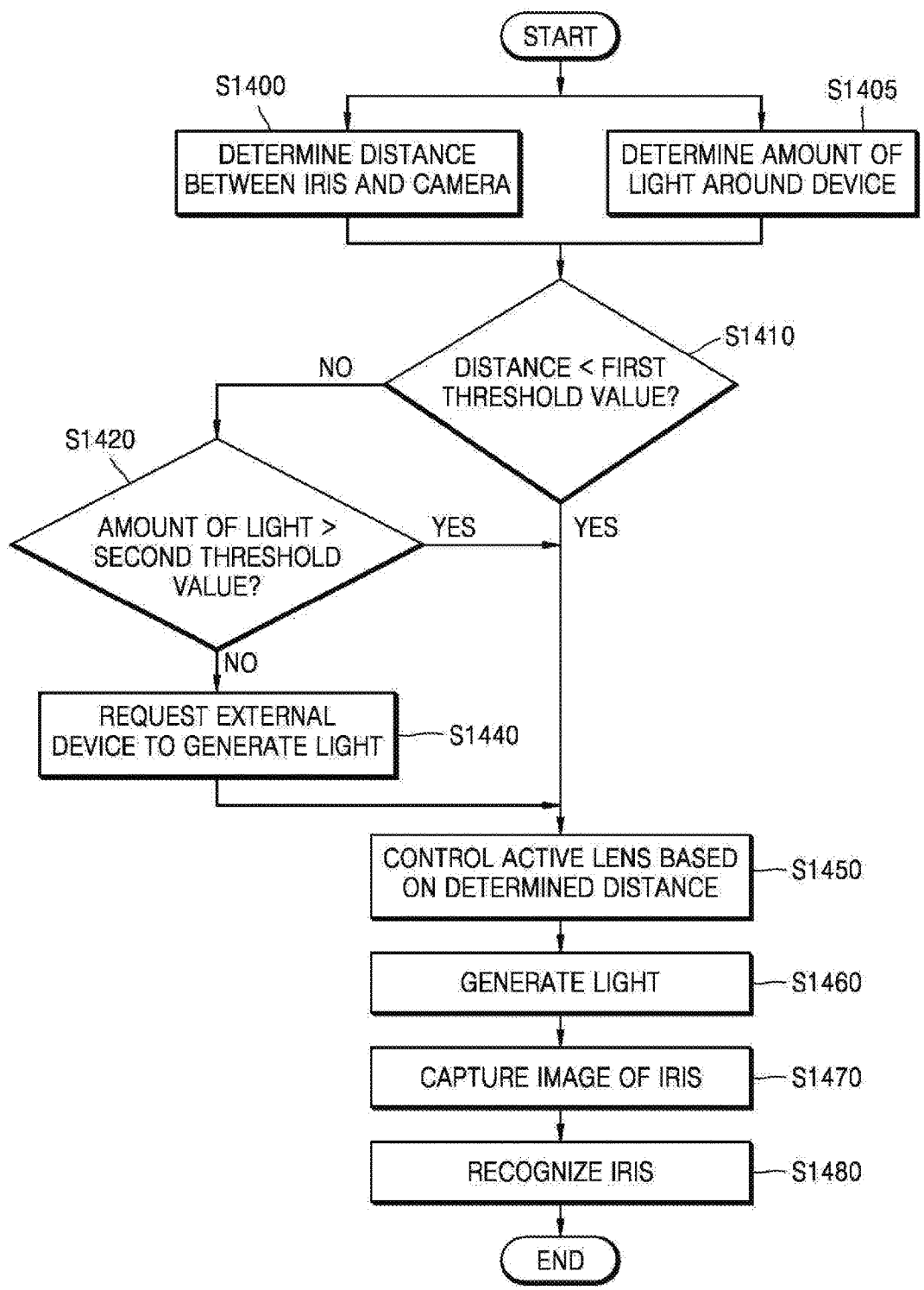
FIG. 14 is a flowchart of a process of controlling an active lens, further taking an ambient light amount into account, according to an embodiment of the present disclosure.

FIG. 14 is a flowchart of a process of controlling an active lens, further taking an ambient light amount into account according to an embodiment of the present disclosure.

Referring to FIG. 14, in operation S1400, a device 100 determines the distance between an iris 10 and a camera. Herein, the camera may be at least one of the IR camera 133-1, the TOP camera 133-2, and the camera 161. In operation 51405, the device 100 determines the amount of light around the device 100.

In operation S1410, the device 100 determines whether the determined distance is less than a first threshold value. If the determined distance is less than the first threshold value, the device 100 controls an active lens 131 based on the determined distance and the determined amount of light in operation S1450.

If the determined distance is not less than the first threshold value, the device 100 determines whether the determined amount of light is greater than a second threshold value in operation S1420. Herein, the second threshold value may be determined according to the determined distance in operation S1400. For example, if the distance determined in operation S1400 is long, the iris 10 may be image-captured when the surroundings of the device 100 is bright, such that the device 100 may determine a large value for the second threshold value. However, if the distance determined in operation S1400 is short, the iris 10 may be image-captured even when the surrounding of the device 100 is dark when compared to a case with the long distance determined in operation S1400, such that the device 100 determines a small value for the second threshold value.

If the amount of light is greater than the second threshold value, the device 100 controls the active lens 131 based on the determined distance and the determined amount of light in operation S1450. That is, if the determined distance is less than the first threshold value and the determined amount of light is greater than the second threshold value, the surrounding of the device 100 is sufficiently bright even when the distance from the device 100 to the iris 10 is long, such that the device 100 may not request the external device 1100 to generate light. If the determined amount of light is less than the second threshold value, the device 100 requests the external device 1100 to generate light in operation S1440 and controls the active lens 131 based on the determined distance and the determined amount of light in operation S1450.

In operation S1460, the device 100 generates light through the light source 132 but may not be required to do so. Depending on an embodiment, operation S1460 may be omitted. In operation S1470, the device 100 captures the image of the iris 10 by using light generated by at least one of the device 100 and the external device 1100.

In operation S1480, the device 100 performs iris recognition based on the image of the iris 10 captured by the image capturer 133.

An embodiment of the present disclosure may be implemented as a recording medium including a computer-executable instruction such as a computer-executable program module. A computer-readable medium may be an arbitrary available medium that is accessible by a computer and may include volatile and non-volatile media and separable and inseparable media. The computer-readable medium may include a computer storage medium and a communication medium. The computer storage medium may include volatile, non-volatile, separable, and inseparable media implemented using an arbitrary method or technique for storing information such as a computer-readable instruction, a data structure, a program module, or other data. The communication medium may typically include computer-readable instructions, a data structure, a program module, other data of a modulated data signal such as carriers, or other transmission mechanisms, and may also include an arbitrary information delivery medium.

The above description is intended to illustrate various embodiments of the present disclosure, and it may be easily understood by those of ordinary skill in the art that the present disclosure may be easily modified into other detailed forms without changing the technical spirit or essential features of the present disclosure. The embodiments should be considered in a descriptive sense only and not for purposes of limitation. For example, each element described as a single type may be distributed, and similarly, elements described as distributed may be combined.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A device for photographing an iris, the device comprising:
    a light source configured to generate light;
    an active lens configured to have an adjustable refractive index to change a light irradiated to the iris;
    an image capturer configured to capture an image of the iris by using a camera and the changed light irradiated to the iris; and
    at least one processor configured to control the active lens to change the light irradiated to the iris based on at least one detected photographing condition.

2. The device of claim 1,
    wherein the light source comprises at least one infrared emitting diode (IRED) for generating IR rays used to capture the image of the iris, and
    wherein the at least one processor is further configured to perform iris recognition with respect to the captured image of the iris.

3. The device of claim 1, further comprising:
    a distance sensor configured to determine a distance between the iris and the device as a detected photographing condition,
    wherein the at least one processor is further configured to control the active lens based on the distance determined by the distance sensor.

4. The device of claim 3, further comprising:
    a transceiver configured to communicate with an external device,
    wherein the at least one processor is further configured to request through the transceiver that the external device generate light if the determined distance is greater than a threshold value.

5. The device of claim 3, wherein the at least one processor is further configured to control the active lens based on the determined distance to control an amount of light arriving at the iris.

6. The device of claim 1, further comprising:
    a light amount sensor configured to sense an amount of light around the device as a detected photographing condition,
    wherein the at least one processor is further configured to control the active lens based on the amount of the light sensed by the light amount sensor.

7. The device of claim 6, further comprising:
    a transceiver configured to communicate with an external device,
    wherein the at least one processor is further configured to request through the transceiver that the external device generate light if the sensed amount of light is less than a threshold value.

8. The device of claim 1, further comprising:
    a parabolic lens configured to form a radiation plane of light generated by the light source.

9. The device of claim 1, further comprising:
    a motion sensor configured to detect motion of the device relative to the iris as a detected photographing condition,
    wherein the at least one processor is further configured to control the active lens based on the motion detected by the motion sensor.

10. A method of obtaining an image of an iris, the method comprising:
    generating light by using a light source;
    controlling an active lens configured to have an adjustable refractive index to change a light irradiated to the iris based on at least one detected photographing condition; and
    capturing an image of the iris by using a camera and the changed light irradiated to the iris.

11. The method of claim 10,
    wherein the generation of light comprises generating infrared (IR) rays for capturing the image of the iris, and
    wherein the method further comprises performing iris recognition based on the captured image of the iris.

12. The method of claim 10, wherein the controlling of the active lens comprises:
    determining a distance between the iris and the device as a detected photographing condition; and
    controlling the active lens based on the determined distance.

13. The method of claim 12, wherein the generation of light comprises requesting that an external device generate light if the determined distance is greater than a threshold value.

14. The method of claim 12, further comprising controlling the active lens based on the determined distance to control an amount of light arriving at the iris.

15. The method of claim 10, wherein the controlling of the active lens comprises:
    determining an amount of light around the device as a detected photographing condition; and
    controlling the active lens based on the determined amount of light.

16. The method of claim 15, wherein the generation of light comprises requesting that an external device generate light if the determined amount of the light is less than a threshold value.

17. The method of claim 10, further comprising:
    detecting motion of the device relative to the iris as a detected photographing condition; and
    controlling the active lens based on the detected motion.

18. A non-transitory recording medium having recorded thereon a program for controlling at least one processor to perform operations executing the method of claim 10.

* * * * *